United States Patent
Prismantas et al.

(10) Patent No.: US 7,675,840 B1
(45) Date of Patent: *Mar. 9, 2010

(54) SYSTEM AND METHOD FOR MITIGATING DATA FLOW CONTROL PROBLEMS IN THE PRESENCE OF CERTAIN INTERFERENCE PARAMETERS

(75) Inventors: Jerry Prismantas, Federal Way, WA (US); Jean-Francois Grenon, Seattle, WA (US); Lycklama A'nyeholt Heinz, Arlington, WA (US); Randy J. Karr, Maple Valley, WA (US); Bruce C. Rothaar, Woodinville, WA (US)

(73) Assignee: Adaptix, Inc., Carrollton, TX (US)

( * ) Notice: Subject to any disclaimer, the term of this patent is extended or adjusted under 35 U.S.C. 154(b) by 139 days.

This patent is subject to a terminal disclaimer.

(21) Appl. No.: 11/939,874

(22) Filed: Nov. 14, 2007

Related U.S. Application Data

(63) Continuation of application No. 09/843,621, filed on Apr. 26, 2001, now Pat. No. 7,369,484.

(51) Int. Cl.
*H04J 1/12* (2006.01)
(52) U.S. Cl. .................... 370/201; 455/63.1; 375/346
(58) Field of Classification Search .................... None
See application file for complete search history.

(56) References Cited

U.S. PATENT DOCUMENTS

| | | | |
|---|---|---|---|
| 5,574,979 | A | 11/1996 | West |
| 5,889,821 | A | 3/1999 | Arnstein et al. |
| 5,946,624 | A | 8/1999 | Petranovich et al. |
| 6,006,071 | A | 12/1999 | Roberts et al. |
| 6,016,313 | A | 1/2000 | Foster, Jr. et al. |
| 6,301,306 | B1 | 10/2001 | McDonald et al. |
| 6,346,692 | B1 | 2/2002 | Ubowski et al. |
| 6,374,082 | B1 | 4/2002 | Carlson |
| 6,463,261 | B1 | 10/2002 | Hiramatsu et al. |
| 6,470,006 | B1* | 10/2002 | Moulsley ..................... 370/347 |
| 6,704,346 | B1 | 3/2004 | Mansfield |
| 6,704,579 | B2 | 3/2004 | Woodhead et al. |
| 6,711,380 | B1 | 3/2004 | Callaway, Jr. |
| 6,865,170 | B1 | 3/2005 | Zendle |
| 7,016,686 | B2 | 3/2006 | Spaling et al. |
| 7,024,680 | B2 | 4/2006 | Howard |

(Continued)

OTHER PUBLICATIONS

U.S. Appl. No. 09/843,621, Prismantas.

(Continued)

*Primary Examiner*—Michael J Moore, Jr.
(74) *Attorney, Agent, or Firm*—Fulbright & Jaworski L.L.P.

(57) ABSTRACT

A radar, or other repetitive interference, detection and data flow control system and method for RF data transmissions uses an RF detector and an omni directional antenna to detect radar or similar signals. The information from the RF detector is communicated to a hub data transmission unit which processes the data about the signal provided by the detector. This information is used by the hub to schedule communications between the hub and subscriber units so that none of the communications between the hub and subscriber fall within the time period of the interfering pulses. Although there are no communications during the time periods of the pulses, the efficiency of communications is improved because collisions and retransmission of data are avoided.

36 Claims, 2 Drawing Sheets

U.S. PATENT DOCUMENTS

| | | |
|---|---|---|
| 7,334,253 B2 | 2/2008 | Howard |
| 7,369,484 B1 * | 5/2008 | Prismantas et al. .......... 370/201 |
| 7,395,087 B2 * | 7/2008 | Watanabe ................ 455/553.1 |
| 2002/0155811 A1 | 10/2002 | Prismantas et al. |
| 2002/0173271 A1 | 11/2002 | Blair et al. |

OTHER PUBLICATIONS

U.S. Appl. No. 09/851,408, Rothaar et al.
U.S. Appl. No. 10/010,935, Prager et al.

* cited by examiner

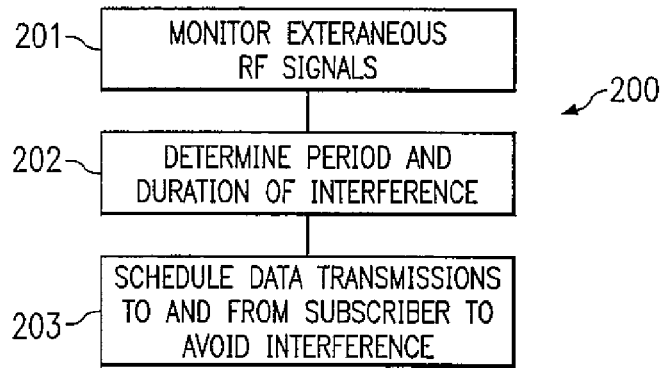
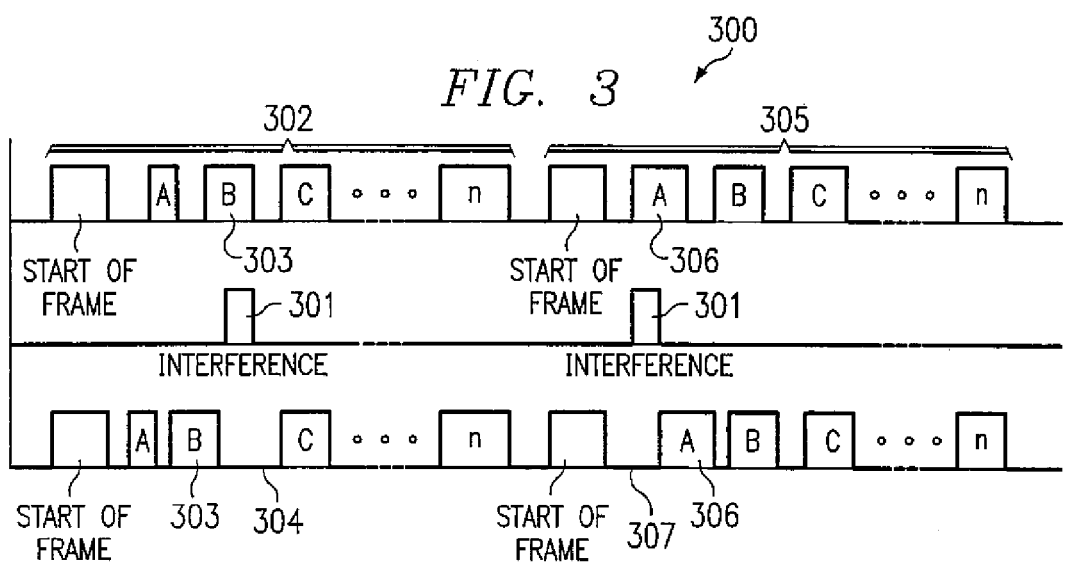
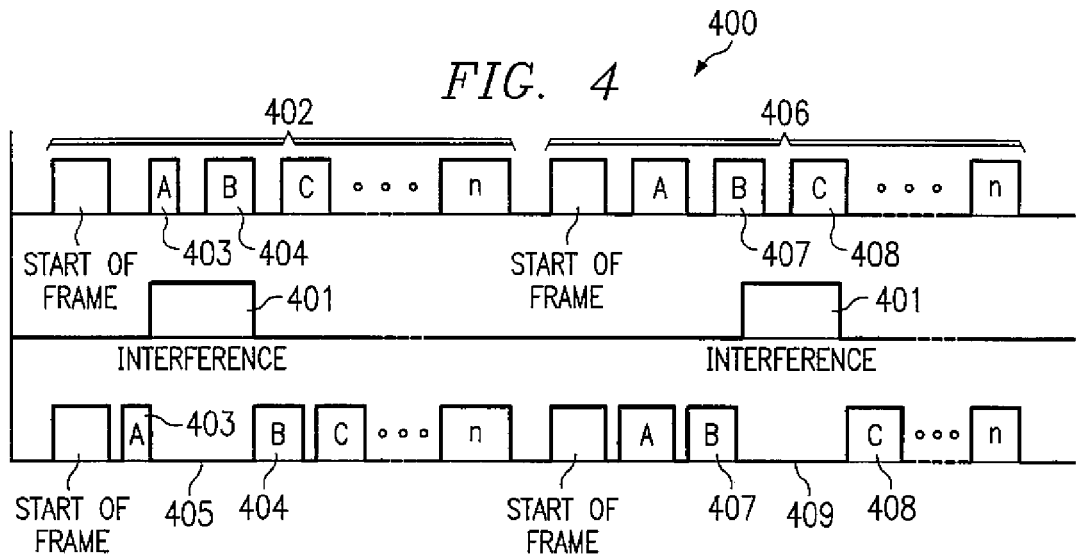

SYSTEM AND METHOD FOR MITIGATING DATA FLOW CONTROL PROBLEMS IN THE PRESENCE OF CERTAIN INTERFERENCE PARAMETERS

CROSS-REFERENCE TO RELATED APPLICATIONS

This application is a continuation of U.S. patent application Ser. No. 09/843,621 filed Apr. 26, 2001, now U.S. Pat. No. 7,369,484, entitled "SYSTEM AND METHOD FOR MITIGATING DATA FLOW CONTROL PROBLEMS IN THE PRESENCE OF CERTAIN INTERFERENCE PARAMETERS," the disclosure of which is incorporated herein by reference.

TECHNICAL FIELD

The present invention relates to communications interference detection and mitigation systems and more particularly to a system and method for detecting certain types of RF interference and blanking RF data flow control in response thereto.

BACKGROUND OF THE INVENTION

Currently, there are several so-called "last mile" and "last foot" transmission systems which are designed to deliver high speed and/or high data capacity from one location to another. Several such systems use RF transmission to replace copper wire. Some of these systems are called point to point or point to multipoint systems and operate in various RF bands. A fundamental characteristic of such existing systems is that their RE transmissions occur in a frequency spectrum protected and regulated by a government body. These protected frequency spectrums, or bands, are licensed to certain license holders and only one operator (or a selected few) may operate in any given physical area. In such situations, rigorous rules apply to anyone holding permits for the usage of those protected bands. Another fundamental characteristic of such protected bands is that all users are licensed to perform the same type of RF transmission.

When operating in a licensed band the interference between transmissions is not only homogeneous, i.e., wideband, it originates from the same type of antenna to accomplish the same type of transmission and is thus controllable. Accordingly, noise (interference from another transmitter on the same frequency or on an interfering frequency) typically will be evenly spread.

In a typical licensed application, the frequency coordination would mathematically predict a certain low level of interference, and if you could not achieve a low level of interference, the license would not be granted. Once a governing body grants a license, then the user is afforded protection. Thus, in a protected band, if a narrow band interferer is detected, the licensed user could call the FCC (or other regulating agency) and ask that the agency investigate and rectify the problem. In an unlicensed band, the user is essentially on his/her own and usually no such official remedy is available.

Because of the licensed nature of some RF bands, only a limited number of companies may provide service within those bands. Thus, in order to widen the choices consumers have, it is desirable for service providers to be able to use unlicensed RF bands to provide high data rate capability to deliver high speed, high capacity data services.

In 1997 the FCC created a wireless arena called Unlicensed National Information Infrastructure (U-NII). System operators are free to operate wireless equipment in three sub-bands (5.15 to 5.25 GHz, 5.25 to 5.35 GHz and 5.725 to 5.825 GHz) without acquiring a licensed frequency spectrum. Part 15 of the FCC document specifies the conditions for operating wireless equipment in the U-NII frequency band. However, operators are not protected from possible interference from other U-NII operators transmitting in the vicinity or even other systems which utilize the same frequencies.

The IEEE, a standards group, is defining a wireless LAN standard, referred to as IEEE 802.11a for operation in the U-NII band. Equipment that conforms to this standard will operate indoors at the lower frequency sub-band i.e. 5.15 to 5.25 GHz. The ETSI BRAN group in Europe has defined an air interface standard for high-speed wireless LAN equipment that may operate in the U-NII frequency band. Equipment that is compatible with this standard may cause interference with use of these unlicensed bands.

One major problem with the use of such unlicensed bands is that it is very difficult, if not impossible, to control RF interference from other users of the unlicensed band. These other users may be using the selected unlicensed band for uses which are essentially different from that employed to deliver communication services. For example, the 5.25 to 5.35 GHz and 5.725 to 5.825 GHz bands are available for use for outdoor data communication between two points. This is typically a wideband use. The same bands are also available for other applications including radar. When the same band is used for wideband communication and also used by others for uses such as radar, data communications between sending and receiving antennas will experience significant interference from radar pulses, which are broadcast over a wide area in repetitive bursts.

In the current state of the art, there is no discrimination between narrow band or wideband interference. When interference is detected, it is usually based on a signal to noise ratio for any given channel, then the radio switches to a lower order modulation, from either 64QAM to 16QAM, or 16QAM to QPSK, or QPSK to BPSK. Such a lower modulation shift allows more tolerance for noise and interference. Similarly, for Orthogonal Frequency Division Multiplexing (OFDM), the modulation order of the subcarriers is optimized for any given signal to noise ratio.

The prior art of radar interference mitigation is intended for use in currently licensed RF bands. However, radar interference is not an issue of great concern in licensed bands because there is little or no such interference. Most licensed bands are free and clear of other harmful interferers. As a result licensees do not have to deal with the issue of narrow band interference such as radar. Additionally, most unlicensed bands do not have strong radar interferers. However, there is other low level interference in the unlicensed RF bands. This interference is at a much lower level and has a different signature than high powered radar. Therefore, generally speaking, prior art interference mitigation systems do not detect radar interference nor do they attempt to avoid it.

SUMMARY OF THE INVENTION

The present invention is directed to a system and method which detects repetitive RF signals, including radar, and mitigates the effects of these signals on data transmissions in RF bands by blanking the data transmissions for a period of time coinciding with the period of the repetitive interference signal and rescheduling transmissions.

The system operates with an RF detector and an omni directional antenna to detect RF or other periodic signals. The information from the RF detector is communicated to a hub data transmission unit which processes the data pertaining to the signal. This information is used by the hub to schedule communications between the hub and subscriber stations so that none of the communications between hub and subscriber stations fall within the time period that a radar or other interfering pulse is present. Although there are no communications during the time period of the radar pulses, which increases overhead, the efficiency of the communications is improved. Efficiency is improved because collisions and retransmission of data that would otherwise occur, if transmissions were carried on during the radar pulses, are avoided. As a result, the overall throughput is increased because of this intelligent scheduling.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 2 is a flow diagram showing typical operation; and

FIGS. 3 and 4 show how time slots can be skipped, shifted or rescheduled to avoid radar interference.

DETAILED DESCRIPTION OF THE PREFERRED EMBODIMENT

Figure 1:
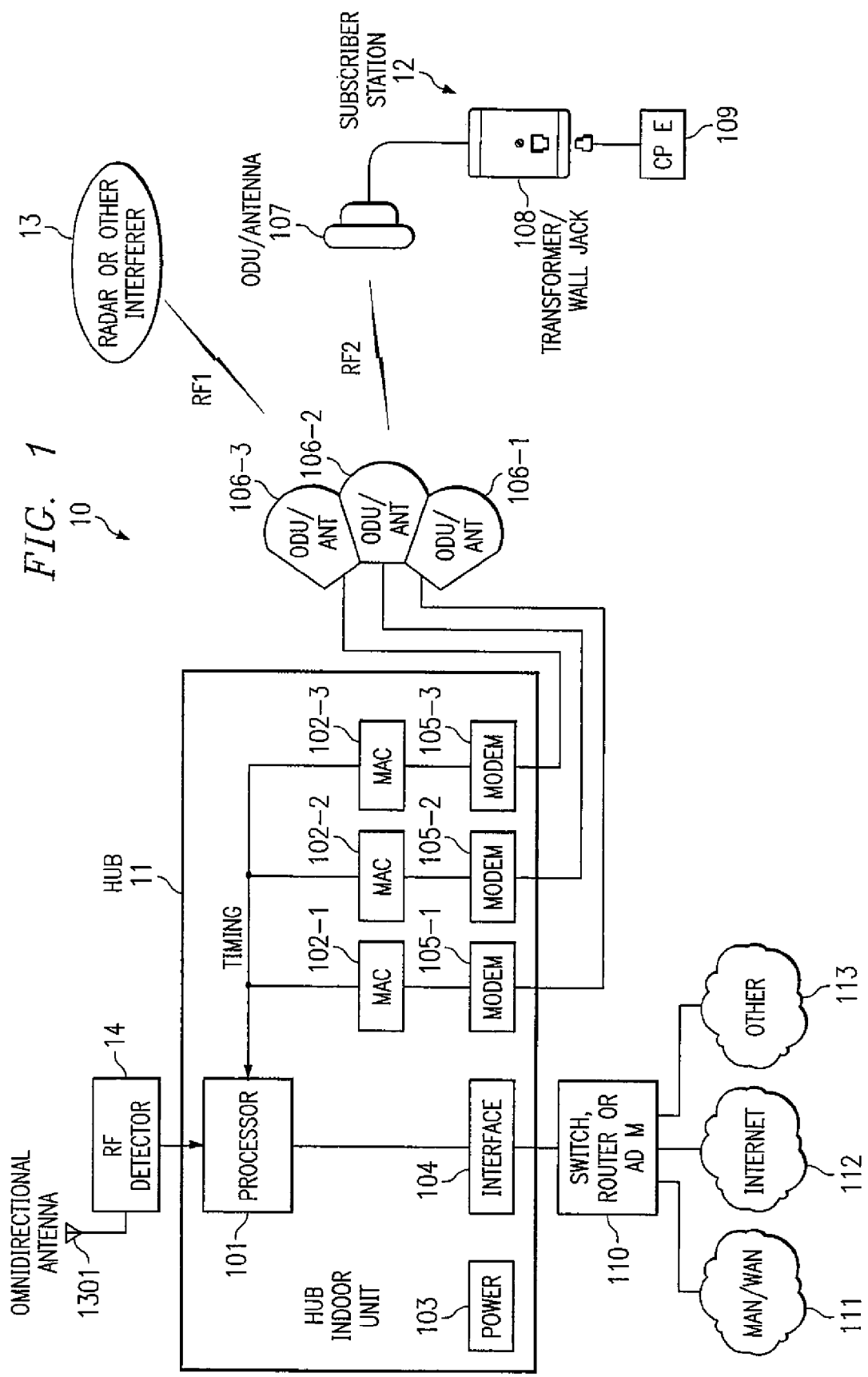
FIG. 1 is a diagram of an RF data transmission system using the system and method of radar detection and data flow blanking control of the present invention.

The present invention is directed to a system and method which detects repetitive, RF signals, such as radar, and mitigates their effect on data transmission in various RF bands by blocking data transmissions for a period of time coinciding with the period of the radar signal. Turning to FIG. 1, data transmission system 10 has hub 11 (which could be one of many) and subscriber station 12, again one of many. Hub 11 is connected in a typical installation to other remotely located users (not shown) via one or more networks, such as MAN/WAN 111, Internet 112, or any other network, such as network 113, all via switch, router and/or add drop multiplexer (ADM) 110 and interface 104. These networks could be internal to an enterprise or could be connected to public or private networks either directly or via an intermediary network. Power for the hub 11 is provided via power supply 103.

Hub 11 serves to direct communications between subscriber 12 and other users over RF link RF2 between one or more hub antennas 106 and subscriber antenna 107. Transmission between these antennas can use one or more modulations, such as but not limited to, OFDM, 64QAM, 16QAM, QPSK or BPSK. At subscriber station 12, transmission to/from customer premises equipment (CPE) 109 flows, by way of example, via wall jack 108. A repetitive interferer, such as radar antenna 13 sending out RF signals RF1 impinging on antenna 106-2 causes interference with transmission between hub 11 and subscriber 12.

An omnidirectional antenna 1301 is connected to an RF detector 14. The RF detector 14 provides strength of signal, duration and timing information associated with a radar or other interfering pulse to the processor 101 for an interference source 13. Preferably, the omnidirectional antenna and radar detector data can be supplemented by directional information from the hub antennas 106-1, 106-2 and 106-3, which are sectorized.

The subscriber station antenna 107 can also detect radar interferers. The subscriber antenna is a much more directional antenna and it is not generally set up as high above the ground as the hub antennas, so there is much less chance for interference on the subscriber station. However, the subscriber station can perform the same type of radar detection and rescheduling for data transmissions as discussed for the hub to avoid interference. However, The subscriber station preferably does not have dedicated RF detector hardware. Preferably it uses its primary receiver to detect interference.

The timing of data transmission to avoid radar or other interfering pulses is handled by the hub's processor 101 and the media access control layer (MAC) 102 for each modem 105. Timing is coordinated so that interference will be mitigated by scheduling data transmissions via modems 105 around interfering pulses. Similarly, for the subscriber stations, additional functionality is built into the subscriber station processor and MAC for interference mitigation.

System 10 preferably synchronizes to the radar signal RF1. The processor 101 predicts the next pulses staying locked to the frequency of the pulses, and reschedules data transmissions for the period that the interference from the pulses of the radar occurs. This method is much more efficient in terms of data throughput than not rescheduling the data. In other words, if a data/radar collision occurs, the data must be resent resulting in a loss of time. It is much more efficient to just avoid transmission for the period of the radar pulse. The software acting as the MAC makes a decision whether it is more efficient in terms of payload, customer payload or data payload to reschedule the data, or to allow the forward error correction (FEC) to attempt to correct errors in the data transmission. If the radar pulses are short enough in duration, it may be more efficient to let the FEC circuit associated with the subscriber CPE 109 handle the errors, or allow the errors to occur and resend the data. Hence, the intelligence and the algorithm of the MAC software will need to determine the most efficient action, be it rescheduling or to do nothing.

Preferably, the period of the radar pulse and the repetition rate of the radar pulses are tracked. If the repetition rate of the radar pulses is too short or too long to be handled by an interleaver, then the MAC software will also make the decision on whether to reschedule or to allow the FEC to fix the errors. Interleaving coded data transforms bursty channel errors into discrete independent errors. An interleaver formats encoded data in a rectangular array of rows and columns. The bits are stored row-wise and read out column-wise at a transmitter. At a receiver, the data is read out row-wise, restoring the original data sequence. As a result of this reordering of the data during transmission, a large burst or block of errors is broken up into a stream of smaller independent errors, which can be corrected.

The logical branch diagram of FIG. 2 illustrates the present method for radar and other interference detection and rescheduling of data flow control 200. In box 201 extraneous RF signals are monitored in accordance with the methods described herein, using an omnidirectional antenna and an RF detector. The hub antennas can be used to provide directional information about the interference. In box 202 the periods and duration of the interference is determined by processor 101. Processor 101 uses this information to develop a profile of interference so that it can schedule data transmissions around the interference, as indicated in box 203. This scheduling will avoid data transmission during predictable times of interference from a regular interferer such as a radar installation 13. The data transmissions will be rescheduled to avoid the profiled radar or offending pulse.

For example, in FIG. 3 scheme 300 is shown for minimizing the effects of interference 301 in accordance with the mitigation technique of FIG. 2. For a number (n) of various length transmission time slots, 302, broadcasting at a given frequency and polarity, one time slot, B, 303 is disrupted by interference pulse 301. As shown in the lower left portion of FIG. 3, time slot B's transmission is rescheduled, shifting transmission to avoid interference 301 leaving an unused time slot or blank 304. Since interference pulse 301 can be of varying length and is not necessarily synchronized to the transmission time slots, interference 301 can later impinge on a different time slot, as illustrated in the right side of FIG. 3. Here interference pulse 301 has disrupted time slot A, 306, of a number of varying length time slots, 305. Here the time slots of the transmissions are shifted or rescheduled to allow time slot A, 306, to transmit in the clear. Thus, creating blank 307. If the interference is permanent or continues for a long period of time, a higher order modulation or different code rate may be used to accommodate the data within the remaining available time. Alternatively, the overall code rate can be reduced to accommodate the data within fewer time slots, or the overall data throughput reduced.

Turning to FIG. 4 another interference mitigation scheme 400 in accordance with the mitigation technique of FIG. 2 is shown for interference 401 affecting two time slots 403 and 404, or 407 and 408 of a number of various length time slots, 402 and 406, respectively. Shifting the transmissions in time allows transmission of time slots 403, 404, 407 and 408 in the clear. Here the interference originally impinges upon two separate time slots 403 and 404, or 407 and 408. In the lower portion of FIG. 4 it is shown that by shifting or rescheduling the time slots of data transmissions blanks 405 and 409 is created as opposed to corrupting the pairs of data time 403 and 404, or 407 and 408.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of reducing repetitive RF interference with RF transmissions, said method comprising the steps of:
    detecting interference using a filter;
    sweeping said filter across an RF band of interest;
    calculating characteristics of RF interference within said RF band of interest to arrive at an interference profile of periodicity and discrete durations of said interference,
    determining the most efficient of:
        scheduling said RF data transfer during intervals that avoid said interference; and
        transmitting said RF data during said data transfer intervals and allowing forward error correction of a receiver to correct errors in said RF data transfer; and
    determining the most efficient of:
        adjusting time sequences of RF transmissions to accommodate said interference profile; and
        resending said data sent during said interference.

2. The method of claim 1 wherein said filter is a narrow band filter.

3. The method of claim 1 wherein said RF data transmissions occur in sequential repetitive time slots and wherein said adjusting step includes the step of eliminating at least one of said time slots for the duration of said interference.

4. The method of claim 3 wherein said RF data transmissions are rescheduled for the duration of said interference.

5. The method of claim 4 wherein a modulation of said RF transmissions is changed to accommodate data in remaining ones of said time slots.

6. The method of claim 4 wherein a code rate of said RF data transfer is adjusted to accommodate remaining ones of said time slots.

7. The method of claim 1 wherein said RF interference is repetitive RF interference.

8. The method of claim 7 wherein said repetitive RF interference is a radar signal.

9. The method of claim 1 wherein efficiency is based on one or more of payload, customer payload, and data payload.

10. A subscriber station comprising:
    means for receiving RF data;
    means for detecting intermittent RF interference which occurs during RF data transfer intervals to said subscriber station, said detecting including obtaining periodicity and duration data;
    means operative in response to said periodicity and said duration data, for scheduling receipt of said RF data at said subscriber station during intervals that avoid said interference; and
    means for determining the most efficient of:
        scheduling said RF data transfer during said intervals that avoid said interference, and;
        allowing RF data transfer during said data transfer intervals and allowing forward error correction of a receiver to correct errors in said RF data transfer.

11. The subscriber station of claim 10 wherein said scheduling means includes means for shifting a time sequence of said RF data transfer to avoid said interference.

12. The subscriber station of claim 10 wherein said interference is a radar signal.

13. The subscriber station of claim 10 wherein a modulation of said RF data transfer is changed to accommodate said time sequence shifting.

14. The system of claim 10 wherein a code rate of said RF data transfer is adjusted to accommodate said time sequence shifting.

15. The subscriber station of claim 10 wherein said scheduling means includes means for skipping at least one time slot in a sequence of time slots of said data transfer to avoid said interference.

16. The subscriber station of claim 15 wherein a modulation of said RF data transfer is changed to accommodate said skipping at least one time slot.

17. The subscriber station of claim 15 wherein a code rate of said RF data transfer is adjusted to accommodate said skipping at least one time slot.

18. The subscriber station of claim 10 wherein said means for detecting is the primary receiver of said subscriber station.

19. A method for detecting and mitigating interference with RF data transfer in certain RF bands, said method comprising the steps of:
   determining time periods of repetitive RF interference within an RF band of interest, using a subscriber station receiving said RF data transmission to arrive at an interference profile of periodicity and duration of said interference; and
   determining the most efficient of:
      adjusting a time sequence of desired RF data transfer to accommodate said interference profile, rescheduling data transfer to avoid said interference; and
      allowing transfer of said RF data without said adjusting and resending said data sent during said interference.

20. The method of claim 19 wherein a modulation of said RF data transfer is changed to accommodate adjustment of said time sequence.

21. The method of claim 19 wherein a code rate of said RF data transfer is adjusted to accommodate adjustment of said time sequence.

22. The method of claim 19 wherein said certain RF bands are unlicensed bands.

23. The method of claim 19 wherein said interference is a radar signal.

24. The method of claim 19 wherein said desired RF data transmissions occur in sequential repetitive time slots and wherein said adjusting step includes the step of eliminating at least one of said time slots for the duration of said interference.

25. The method of claim 24 wherein a modulation of said RF data transfer is changed to accommodate data in remaining ones of said time slots.

26. The method of claim 25 wherein a code rate of said RF data transfer is adjusted to accommodate remaining ones of said time slots.

27. The method of claim 19 wherein said subscriber station receives said RF data by a primary receiver.

28. The method of claim 19 wherein efficiency is based on one or more of payload, customer payload, and data payload.

29. A computer program product, stored in computer readable memory and executable by a data processing system, for reducing repetitive RF interference during RF transmissions, said computer program product comprising:
   logic for calculating characteristics of RF interference within an RF band of interest to arrive at an interference profile of periodicity and discrete durations of said interference,
   logic for determining the most efficient of:
   scheduling said RF data transfer during intervals that avoid said interference; and transmitting said RF data during said data transfer intervals and allowing forward error correction of a receiver to correct errors in said RF data transfer; and
   logic for determining the most efficient of:
   adjusting time sequences of RF transmissions to accommodate said interference profile; and
   resending said data sent during said interference.

30. The computer program product of claim 29 wherein said RF data transmissions occur in sequential repetitive time slots and said computer program product further comprises:
   logic for eliminating at least one of said time slots for the duration of said interference.

31. The computer program product of claim 29 wherein said RF data transmissions are rescheduled for the duration of said interference.

32. The computer program product of claim 31 wherein a modulation of said RF transmissions is changed to accommodate data in remaining ones of said time slots.

33. The computer program product of claim 31 wherein a code rate of said RF data transfer is adjusted to accommodate remaining ones of said time slots.

34. The computer program product of claim 29 wherein said RF interference is repetitive RF interference.

35. The computer program product of claim 34 wherein said repetitive RF interference is a radar signal.

36. The computer program product of claim 29 wherein efficiency is based on one or more of payload, customer payload, and data payload.

* * * * *